US006697204B2

(12) United States Patent
Cyrusian

(10) Patent No.: US 6,697,204 B2
(45) Date of Patent: Feb. 24, 2004

(54) METHOD AND APPARATUS FOR OPERATING A CONTINUOUS TIME FILTER OF A READ/WRITE CHANNEL FOR A HARD DISK DRIVE

(75) Inventor: Sasan Cyrusian, Scotts Valley, CA (US)

(73) Assignee: Infineon Technologies AG, Munich (DE)

(*) Notice: Subject to any disclaimer, the term of this patent is extended or adjusted under 35 U.S.C. 154(b) by 291 days.

(21) Appl. No.: 09/865,861

(22) Filed: May 25, 2001

(65) Prior Publication Data
US 2002/0176196 A1 Nov. 28, 2002

(51) Int. Cl.[7] ................................. G11B 5/09
(52) U.S. Cl. .............................. 360/51; 360/61; 360/65
(58) Field of Search .............................. 360/61, 31, 65, 360/51, 46, 27.02, 78.04, 77.08, 78.14, 67; 324/210, 212, 226

(56) References Cited

U.S. PATENT DOCUMENTS

| 5,453,888 | A | * | 9/1995 | Tsunoda | 360/77.08 |
|---|---|---|---|---|---|
| 5,463,603 | A | * | 10/1995 | Petersen | 360/65 |
| 5,684,651 | A | * | 11/1997 | Yaegashi | 360/77.08 |
| 5,862,007 | A | * | 1/1999 | Pham | 360/65 |
| 6,148,431 | A | | 11/2000 | Lee et al. | |
| 6,199,191 | B1 | | 3/2001 | Iwata | |
| 6,219,387 | B1 | | 4/2001 | Glover | |
| 6,487,032 | B1 | * | 11/2002 | Cloke | 360/51 |

OTHER PUBLICATIONS

"Exact Bounds for Viterbi Detector Path Metric Differences," Paul H. Siegel, C. Bernard Shung, Thomas D. Howell, Hermant K. Thapar, IBM Corporation, San Jose, CA.
"A 100MBIT/S Viterbi Decoder Chip: Novel Architecture and its Realization," Gerhard Fettweis, Heinrich Meyr, ICC'90, paper No. 257, session 307A, Atlanta GA, USA, Apr. 16–19, 1990.
"Where do we use Viterbi Decoder?" Opencores.org.
"A Tutorial on Convolutional Coding with Viterbi Decoding," Chip Fleming, Spectrum Applications, 1999, http://pw1.netcom.com/~chip.f/viterbi/tutorial.html.
"PRML: Seagate Uses Space Age Technology Today," http://www.seagate.com/support/kb/disc/prml.html.
"PRML," http://www.idema.org/about/industry/ind_tech_prml.html.
"Hard Disc Data Encoding and Decoding," http://www.storagereview.com/guide2000/ref/hdd/geom/data.html.

(List continued on next page.)

Primary Examiner—Alan T. Faber
(74) Attorney, Agent, or Firm—Brinks Hofer Gilson & Lione

(57) ABSTRACT

A method and apparatus for operating a continuous time filter (CTF) (128) of a read/write channel (108) for a hard disk drive (100). The apparatus includes an input multiplexer (220) that receives an analog signal (215) and transmits the analog signal (215) to a read filter circuit (254) when the CTF (128) is in read mode and to a servo filter circuit (256) when the CTF (128) is in servo mode. The apparatus also includes an output multiplexer (222) that receives a read filter output signal (225) from the read filter circuit (254) when the CTF (128) is in read mode and a servo filter output signal (227) from the servo filter circuit (256) when the CTF (128) is in servo mode. The method includes receiving the analog signal (215) by the input multiplexer (220) and routing the analog signal (215) to the read filter circuit (254) when the CTF (128) is in read mode and routing the analog signal (215) to the servo filter circuit (256) when the CTF (128) is in servo mode.

20 Claims, 3 Drawing Sheets

OTHER PUBLICATIONS

"Technical Requirments for Encoding and Decoding," http://www.storagereview.com/guide2000/ref/hdd/geom/dataRequirements.html.

"Run Length Linited (RLL)," http://www.storagereview.com/guide2000/ref/hdd/geom/dataRLL.html.

"Partial Response, Maximum Likelihood (PRML)," http://www.storagereview.com/guide2000/ref/hdd/geom/dataPRML.html.

"Extended PRML (EPRML)," http://www.storagereview.com/guide2000/ref/hdd/geom/dataEPRML.html.

"MR and PRML: Technologies in Synergy—How Advanced Head and Read Channel Technologies Work Together to Increase Capacity and Improve Performance of Desktop Drives—A Quantum White Paper," http://www.lionsgate.com/Home/baden/public_html_index/SCSI/Quantum_White Papers/MR_Head/MR Apr. 9, 2001.

"Western Digital Corporation– Glossary, Viterbi Detection," http://www.westerndigital.com/company/glossary.html.

"Description of the Algorithms (Part 1)," http://pw1.netcom.com/~chip.f/viterbi/algrthms.html.

"Synchronous Recording Channels—PRML," KnowledgeTek, Inc., 1999.

"A CMOS Continuous–Time Gm–C Filter for PRML Read Channel Applications at 150 Mb/s and Beyond," Iuri Mehr, David R. Welland, IEEE Journal of Solid State Circuits, vol. 32, No. 4, Apr. 1997.

* cited by examiner

METHOD AND APPARATUS FOR OPERATING A CONTINUOUS TIME FILTER OF A READ/WRITE CHANNEL FOR A HARD DISK DRIVE

BACKGROUND

Computer hard disk drives, also known as fixed disk drives or hard drives, have become a de facto standard data storage component of modern computer systems and are making further inroads into modern consumer electronics as well. Their proliferation can be directly attributed to their low cost, high storage capacity and high reliability, in addition to wide availability, low power consumption, high data transfer speeds and decreasing physical size.

These disk drives typically consist of one or more rotating magnetic platters encased within an environmentally controlled housing that further includes all of the electronics and mechanics to read and write data and interface with other devices. Read/write heads are positioned above each of the platters, and typically on each face, to record and read data. The electronics of a hard disk drive are coupled with these read/write heads and include numerous components to control the position of the heads and generate or sense the electromagnetic fields representing data. These components receive data from a host device, such as a personal computer, and translate that data into magnetic encodings written onto the disk platters by the heads. Further, when a host device requests data from the drive, the electronics locate the desired data, sense the magnetic encodings which represent that data and translate those encodings back into the binary digital information which the host device can understand. Further, error detection and correction algorithms are applied to ensure accurate storage and retrieval of data.

One area in which significant advancements have been made has been in the area of read/write head technology and the methods of interpreting the magnetic fluctuations sensed by these heads. The read/write head, of which a typical hard disk has several, is the interface between magnetic platters and the disk drive electronics. The read/write head actually reads and writes the magnetically encoded data as areas of magnetic flux on the platters. Data, consisting of binary 1's and 0's, are encoded by sequences of the presence or absence of flux reversals recorded or detected by the read/write head. A flux reversal is a change in the magnetic flux in two contiguous areas of the disk platter. Traditional hard drives read data off the platters by detecting the voltage peak imparted in the read/write head when a flux reversal passes underneath the read/write head as the platters rotate. This is known as "peak detection." However, increasing storage densities require reduced peak amplitudes and better signal discrimination and higher platter rotational speeds are pushing the peaks closer together thus making peak detection more difficult to accomplish.

Magneto-resistive ("MR") read/write heads have been developed with increased sensitivity to sense smaller amplitude magnetic signals and with increased signal discrimination to address some of the problems with increasing storage densities. In addition, another technology, known as Partial Response Maximum Likelihood ("PRML"), has been developed to further address the problems with peak detection as densities and rotational speeds increase. Borrowed from communications technology, PRML is an algorithm implemented in the disk drive electronics to interpret the magnetic signals sensed by the read/write heads. PRML-based disk drives read the analog waveforms generated by the magnetic flux reversals stored on the disk. However, instead of looking for peak values to indicate flux reversals, PRML-based drives digitally sample this analog waveform (the "Partial Response") and use advanced signal processing technologies to determine the bit pattern represented by that wave form (the "Maximum Likelihood"). This technology, in conjunction magneto-resistive ("MR") heads, have permitted manufacturers to further increase data storage densities. PRML technology further tolerates more noise in the sensed magnetic signals permitting the use of lower quality platters and read/write heads which increases manufacturing yields and lowers costs.

With many different drives available from multiple manufacturers, hard disk drives are typically differentiated by factors such as cost/megabyte of storage, data transfer rate, power requirements and form factor (physical dimensions) with the bulk of competition based on cost. With most competition between hard disk drive manufacturers coming in the area of cost, there is a need for enhanced hard disk drive components which prove cost effective in increasing supplies and driving down manufacturing costs all while increasing storage capacity, operating speed, reliability and power efficiency.

SUMMARY

The present invention is defined by the following claims, and nothing in this section should be taken as a limitation on those claims. By way of introduction, the preferred embodiments described below relate to a continuous time filter of a read/write channel for a hard disk drive. The continuous time filter is adapted to receive an analog signal and includes an input multiplexer and an output multiplexer. The input multiplexer receives the analog signal and transmits the analog signal to a read filter circuit when the continuous time filter is in read mode and to a servo filter circuit when the continuous time filter is in servo mode. The output multiplexer receives a read filter output signal from the read filter circuit when the continuous time filter is in read mode and receives a servo filter output signal from the servo filter circuit when the continuous time filter is in servo mode.

The preferred embodiments further relate to a method for operating a continuous time filter of a read/write channel for a hard disk drive. The method includes receiving an analog signal by an input multiplexer and routing the analog signal to a read filter circuit when the continuous time filter is in read mode and routing the analog signal to a servo filter circuit when the continuous time filter is in servo mode. The method further includes filtering the analog signal using a read filter circuit when the continuous time filter is in read mode and filtering the analog signal using a servo filter circuit when the continuous time filter is in servo mode. Finally, the method includes generating a read filter output signal when the continuous time filter is in read mode and generating a servo filter output signal when the continuous time filter is in servo mode.

Further aspects and advantages of the invention are discussed below in conjunction with the preferred embodiments.

DETAILED DESCRIPTION OF THE PRESENTLY PREFERRED EMBODIMENTS

The embodiments described herein relate to a PRML-based read/write channel device for hard disk drive controllers. The read/write channel is a device coupled with the read/write heads of the hard disk drive. Herein, the phrase "coupled with" is defined to mean directly connected to or indirectly connected with through one or more intermediate components. Such intermediate components may include both hardware and software based components. The read/write channel converts binary/digital data from the host device into the electrical impulses which drive the read/write head to magnetically record the data to the disk drive platters. Further, the read/write channel receives the analog waveform magnetically sensed by the read/write heads and converts that waveform back into the binary/digital data stored on the drive.

Figure 1:
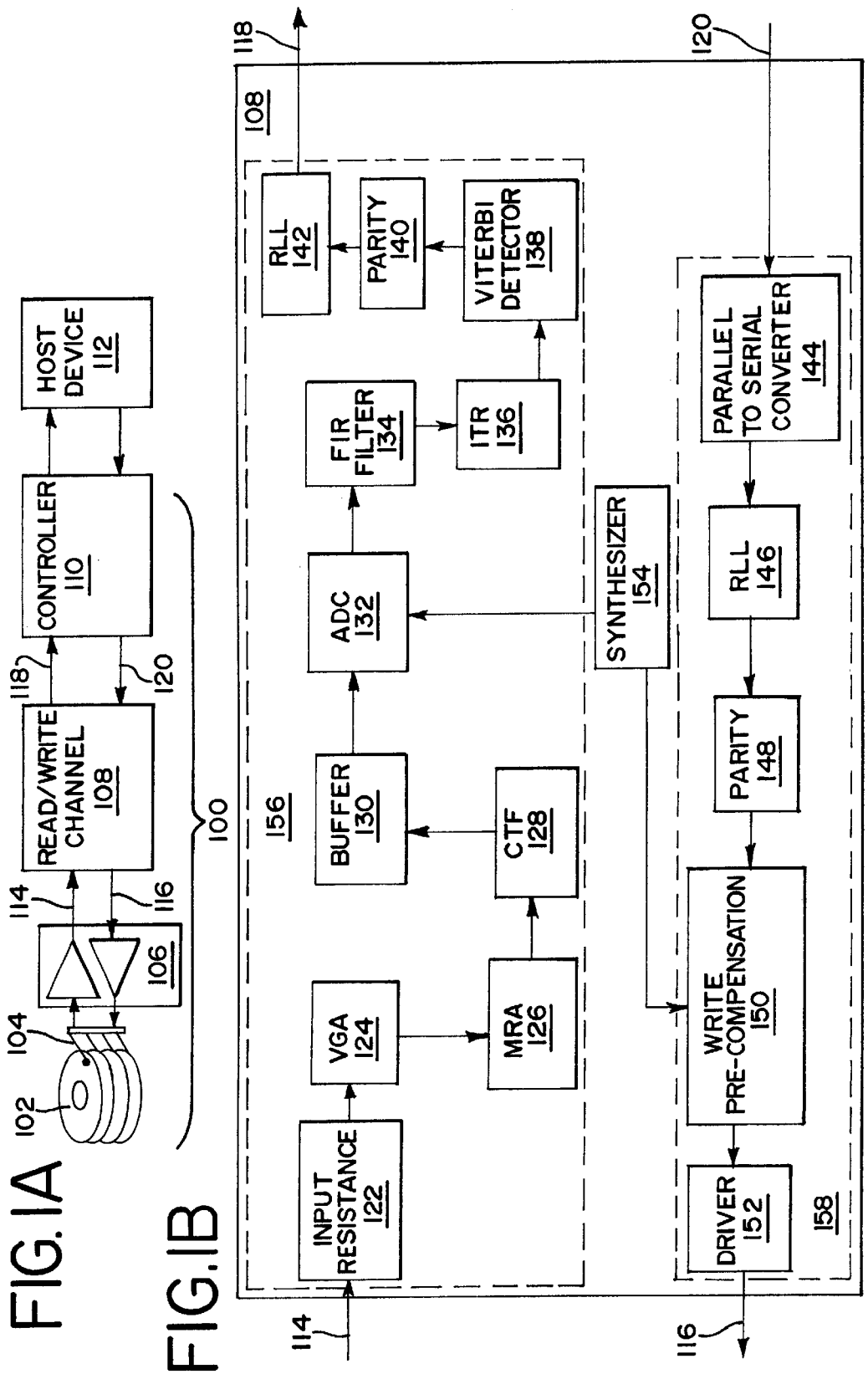
FIG. 1A depicts a block diagram of an exemplary hard disk drive coupled with a host device.
FIG. 1B depicts a block diagram of a read/write channel for use with the disk drive of FIG. 1A.

Referring to FIG. 1A, there is shown a block diagram of an exemplary hard disk drive 100 coupled with a host device 112. For clarity, some components, such as the servo/actuator motor control, are not shown. The drive 100 includes the magnetic platters and spindle motor 102, the read/write heads and actuator assembly 104, pre-amplifiers 106, a read/write channel 108 and a controller 110. The pre-amplifiers 106 are coupled with the read/write channel 108 via interfaces 114, 116. The controller 110 interfaces with the read/write channel 108 via interfaces 118, 120.

For reads from the hard disk 100, the host device 112 provides a location identifier which identifies the location of the data on the disk drive, e.g. a cylinder and sector address. The controller 110 receives this address and determines the physical location of the data on the platters 102. The controller 110 then moves the read/write heads into the proper position for the data to spin underneath the read/write heads 104. As the data spins underneath the read/write head 104, the read/write head 104 senses the presence or absence of flux reversals, generating a stream of analog signal data. This data is passed to the pre-amplifiers 106 which amplifies the signal and passes it to the read/write channel 108 via the interface 114. As will be discussed below, the read/write channel receives the amplified analog waveform from the pre-amplifiers 106 and decodes this waveform into the digital binary data that it represents. This digital binary data is then passed to the controller 110 via the interface 118. The controller 110 interfaces the hard drive 100 with the host device 112 and may contain additional functionality, such as caching or error detection/correction functionality, intended to increase the operating speed and/or reliability of the hard drive 100.

For write operations, the host device 112 provides the controller 110 with the binary digital data to be written and the location, e.g. cylinder and sector address, of where to write it. The controller 110 moves the read/write heads 104 to the proper location and sends the binary digital data to be written to the read/write channel 108 via interface 120. The read/write channel 108 receives the binary digital data, encodes it and generates analog signals which are used to drive the read/write head 104 to impart the proper magnetic flux reversals onto the magnetic platters 102 representing the binary digital data. The generated signals are passed to the pre-amplifiers 106 via interface 116 which drive the read/write heads 104.

Referring to FIG. 1B, there is shown an exemplary read/write channel 108 supporting Partial Response Maximum Likelihood ("PRML") encoding technology for use with the hard disk drive 100 of FIG. 1A. For clarity, some components have been omitted. The read/write channel 108 is implemented as an integrated circuit using a complementary metal oxide semiconductor ("CMOS") process at 0.18 micron. It will be appreciated that CMOS processes include processes which use metal gates as well as polysilicon gates. It will further be appreciated that other process technologies and feature sizes may used and that the circuitry disclosed herein may be further integrated with other circuitry comprising the hard disk electronics such as the hard disk controller logic. As was described, the read/write channel 108 converts between binary digital information and the analog signals representing the magnetic flux on the platters 102. The read/write channel 108 is divided into two main sections, the read path 156 and the write path 158.

The write path 158 includes a parallel-to-serial converter 144, a run-length-limited ("RLL") encoder 146, a parity encoder 148, a write pre-compensation circuit 150 and a driver circuit 152. The parallel-to-serial converter 144 receives data from the host device 112 via interface 120 eight bits at a time. The converter 144 serializes the input data and sends the serial bit stream to the RLL encoder 146. The RLL encoder 146 encodes the serial bit stream into symbolic binary sequences according to a known run-length limited algorithm for recording on the platters 102. The exemplary RLL encoder uses a 32/33 bit symbol code to ensure that flux reversals are properly spaced and that long runs of data without flux reversals are not recorded. The RLL encoded data is then passed to the parity encoder 148 which adds a parity bit to the data. In the exemplary parity encoder 148, odd parity is used to ensure that long run's of 0's and 1's are not recorded due to the magnetic properties of such recorded data. The parity encoded data is subsequently treated as an analog signal rather than a digital signal. The analog signal is passed to a write pre-compensation circuit 150 which dynamically adjusts the pulse widths of the bit stream to account for magnetic distortions in the recording process. The adjusted analog signal is passed to a driver circuit 152 which drives the signal to the pre-amplifiers 106 via interface 116 to drive the read/write heads 104 and record the data. The exemplary driver circuit 152 includes a pseudo emitter coupled logic ("PECL") driver circuit which generates a differential output to the pre-amplifiers 106.

The read path 156 includes an attenuation circuit/input resistance 122, a variable gain amplifier ("VGA") 124, a magneto-resistive asymmetry linearizer ("MRA") 126, a continuous time filter ("CTF") 128, a buffer 130, an analog to digital converter ("ADC") 132, a finite impulse response ("FIR") filter 134, an interpolated timing recovery ("ITR") circuit 136, a Viterbi algorithm detector 138, a parity decoder 140 and a run-length-limited ("RLL") decoder 142. The amplified magnetic signals sensed from the platters 102 by the read/write head 104 are received by the read/write channel 108 via interface 114. The analog signal waveform representing the sensed magnetic signals is first passed through an input resistance 122 which is a switching circuit to attenuate the signal and account for any input resistance. The attenuated signal is then passed to a VGA 124 which amplifies the signal. The amplified signal is then passed to the MRA 126 which adjusts the signal for any distortion created by the recording process. Essentially, the MRA 126 performs the opposite function of the write-pre-compensation circuit 150 in the write path 158. The signal is next passed through the CTF 128, which is essentially a low pass filter, to filter out noise. The filtered signal is then passed to the ADC 132 via the buffer 130 which samples the analog signal and converts it to a digital form. The digital signal is then passed to a FIR filter 134 and then to a timing recovery circuit 136. The timing recovery circuit 136 is connected (not shown in the figure) to the FIR filter 134, the MRA 126 and the VGA 124 in a feedback orientation to adjust these circuits according to the signals received to provide timing compensation. The exemplary FIR filter 134 is a 10 tap FIR filter. The digital signal is then passed to the Viterbi algorithm detector 138 which determines the binary bit pattern represented by the digital signal using digital signal processing techniques. The exemplary Viterbi algorithm detector 138 uses a 32 state Viterbi processor. The binary data represented by the digital signal is then passed to the parity decoder 140 which removes the parity bit and then to the RLL decoder 142 which decodes the binary RLL encoding symbols back into the actual binary data that they represents This data is then passed to the controller 110 via the interface 118.

The read/write channel 108 further includes a clock synthesizer 154. The clock synthesizer 154 generates the clock signals required for operating the read/write channel 108. The exemplary clock synthesizer 154 includes a phased lock look ("PLL") (not shown) with a voltage controlled oscillator and various clock dividers to generate the necessary frequencies.

Figure 2:
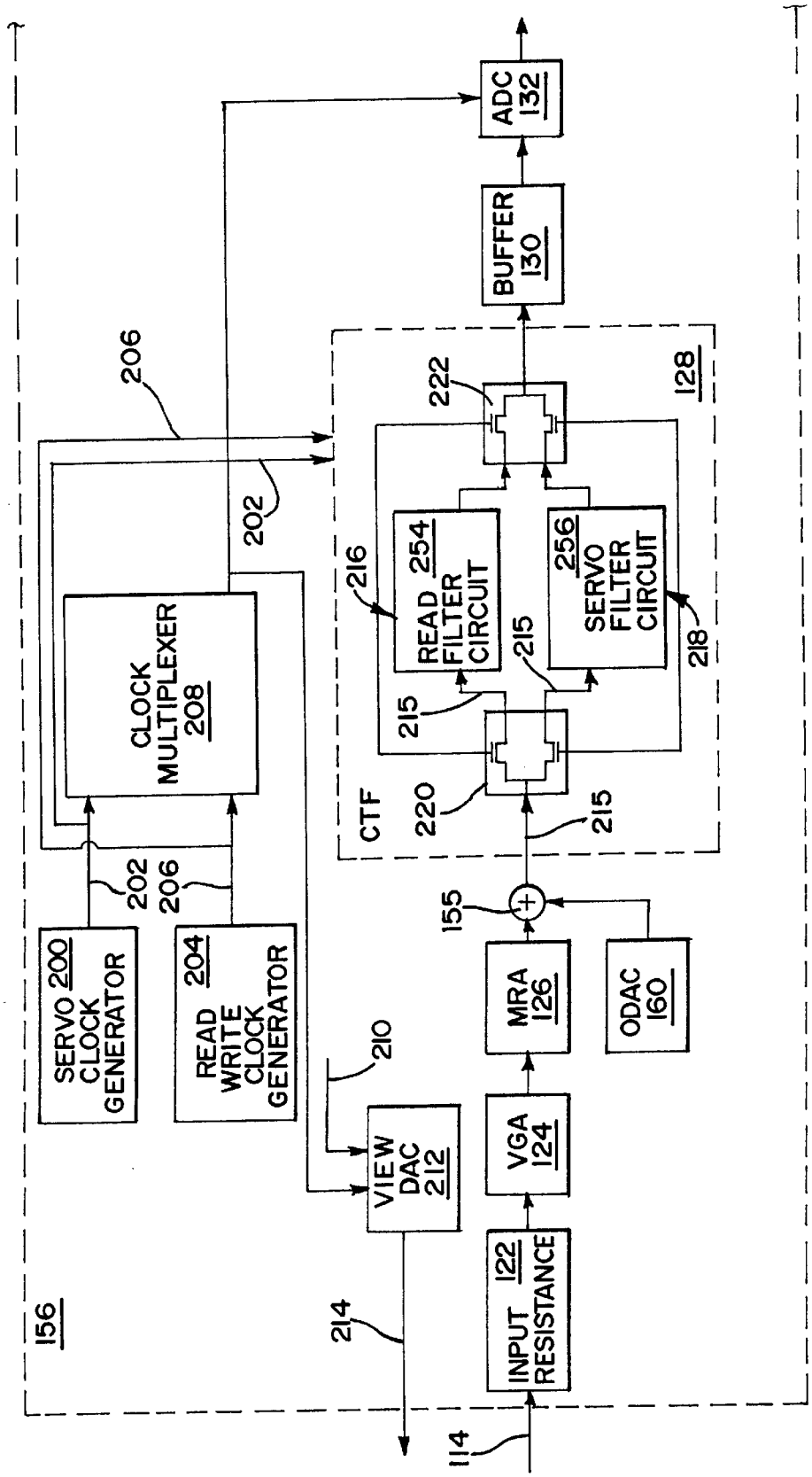
FIG. 2 depicts a block diagram of a portion of a read path of a read/write channel, according to one preferred embodiment.

The read/write channel 108 of the hard drive 100, and more specifically, the continuous time filter 128, operates in two different modes: a read mode and a servo mode. Controller 110 sends a read gate signal 216 and a servo gate signal 218 to the continuous time filter 128 via interface 120, as illustrated in FIG. 1A and FIG. 2. The read gate signal 216 instructs the continuous time filter 128, to go into read mode, while the servo gate signal 218 instruct the continuous time filter 128, to go into servo mode.

During the read mode, the hard drive 100 reads data stored on the magnetic platters 102. During the servo mode, the hard drive 100 tries to figure out the absolute position of the read/write head 104 using servo wedges located on the magnetic platters 102. In servo mode, the hard drive 100 insures that there is no misalignment of the read/write head 104. Typically, the continuous time filter 128 alternates between the read mode and the servo mode. The time required to alternate between the read mode and the servo mode is referred to herein as switching time. The switching time sets a limit on the size of a gap located on the magnetic platters 102 between a read gate and a servo gate or between the servo gate and the read gate. This gap corresponds to wasted bytes of space on the magnetic platter 102 of the hard disk drive 100. Additionally, the continuous time filter 128 includes filtering circuitry that needs to be calibrated before operation of the continuous time filter 128 can begin. The amount of time required to calibrate the filtering circuitry can increase the switching time, and thus increase the size of the gap.

In accordance with one preferred embodiment, the continuous time filter 128 includes a separate read filter circuit 254 and a separate servo filter circuit 256 in order to reduce the switching time, as illustrated in FIG. 2. By including a separate read filter circuit 254 and a separate servo filter circuit 256, the continuous time filter 128 is able to calibrate the read filter circuit 254 while the servo filter circuit 256 is in operation, and conversely the continuous time filter 128 is also able to calibrate the servo filter circuit 256 while the read filter circuit 254 is in operation, thus allowing for a reduction in the amount of time required to switch from the read mode to the servo mode, and from the servo mode back to the read mode. Moreover, by reducing the switching time, the limit on the size of the gap between the read gate and the servo gate or between the servo gate and the read gate, can be reduced. In one preferred embodiment, the limit on the size of the gap is reduced from 8 bytes to less than two bytes, and more preferably, to less than one byte.

Figure 3:
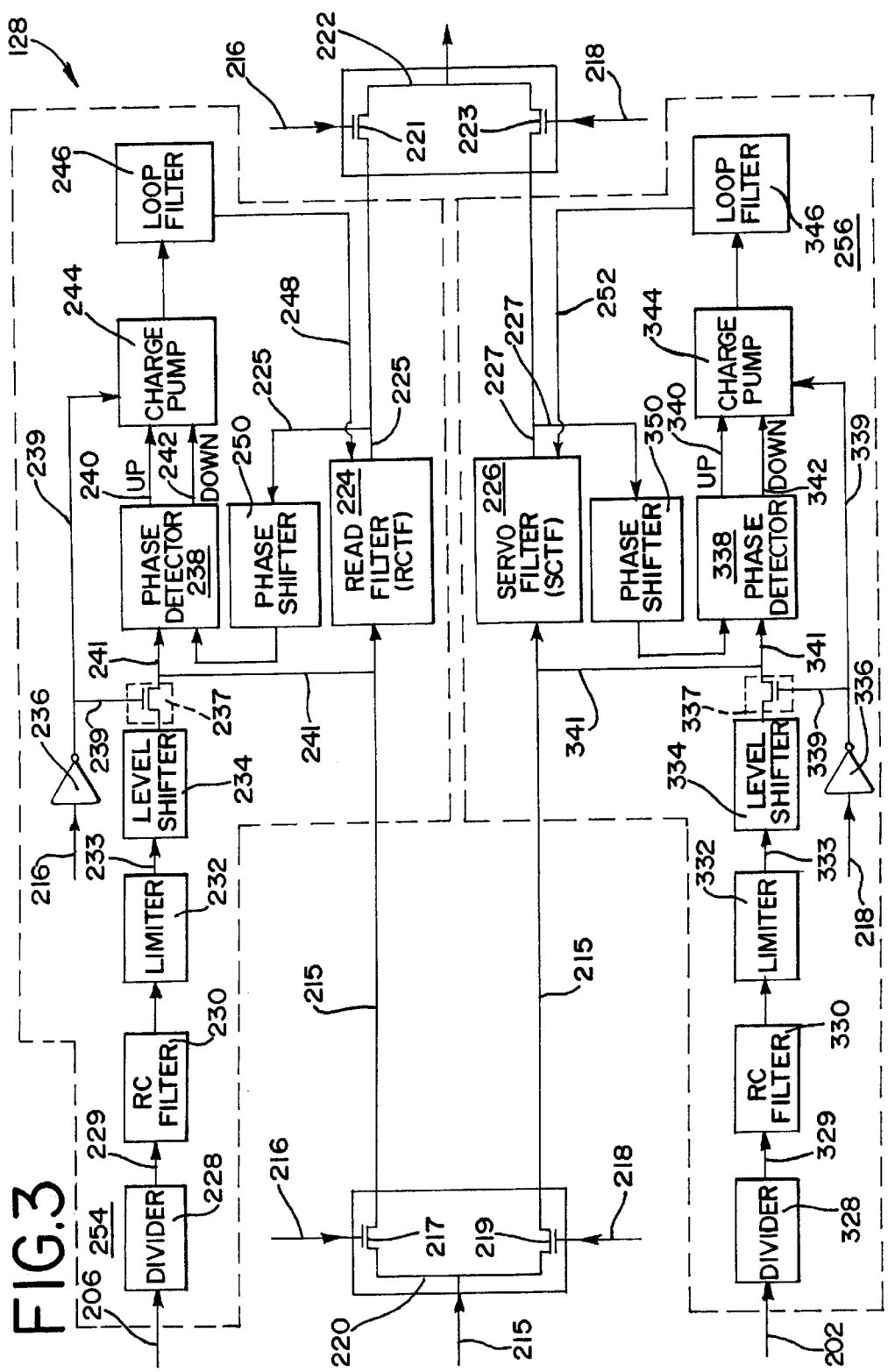
FIG. 3 depicts a block diagram of a continuous time filter, according to one preferred embodiment.

Referring to FIG. 2, the continuous time filter 128 also includes an input multiplexer 220 and an output multiplexer 222. The input multiplexer 220 receives an analog signal 215 from the MRA 126 and transmits the analog signal 215 to either the read filter circuit 254 or the servo filter circuit 256, depending on whether the continuous time filter 128 is in read mode or in servo mode. More specifically, if the controller 110 sends a read gate signal 216 through interface 120 to the continuous time filter 128, the continuous time filter 128 is in read mode. If the controller 110 sends a servo gate signal 218 through interface 120 to the continuous time filter 128, the continuous time filter 128 is in servo mode. If the continuous time filter 128 is in read mode, the read gate signal 216 is also received by the input multiplexer 220. Upon receipt of the read gate signal 216, that is, when the read gate signal 216 is high, a gate 217 within the input multiplexer 220 is turned on and the analog signal 215 is directed to the read filter circuit 254, and more specifically, a read filter 224, for processing. Upon processing the analog signal 215, the read filter 224 generates a read filter output signal 225 that is then passed on to the output multiplexer 222. The output multiplexer 222 also receives a portion of the read gate signal 216. Upon receipt of the read gate signal 216, a gate 221 within the output multiplexer 222 is turned on and the read filter output signal 225 is directed to the buffer 130, as illustrated in FIGS. 2 and 3.

If the continuous time filter 128 is in servo mode, the servo gate signal 218 is also received by the input multiplexer 220. Upon receipt of the servo gate signal 218, that is, when the servo gate signal 218 is high, a gate 219 within the input multiplexer 220 is turned on and the analog signal 215 diverted to the servo filter circuit 256, and more specifically, a servo filter 226, for processing. Upon processing the analog signal 215, the servo filter 224 generates a servo filter output signal 227 that is then passed on to the output multiplexer 222. The output multiplexer 222 also receives a portion of the servo gate signal 218. Upon receipt of the servo gate signal 218, a gate 223 within the output multiplexer 222 is turned on and the servo filter output signal 227 is directed to the buffer 130, as illustrated in FIGS. 2 and 3.

In one preferred embodiment, the input multiplexer 220 receive the analog signal 215 from a stemming node 154. The stemming node 154 is connected with an offset correction DAC (ODAC) 160. The ODAC 160 introduces an analog offset, which is proportional to a digital input controlled by a DC-restore-loop. The DC-restore-loop decides based on the output from the ADC 132 if the offset value of the analog offset introduced by the ODAC 160 has to be increased or reduced. The goal of the DC-restore-loop is to remove any effective offset in the analog signal path. As defined herein, the analog signal path is the signal path that begins with the signal input to the VGA 124 and ends with the ADC 132. The DC-restore-loop increases or reduces the value of the analog offset introduced by the ODAC 160 by adding an offset to the analog signal at the output of MRA 126. Preferably, the analog offset introduced by the ODAC 160 has exactly the same absolute value as the effective offset in the analog signal path. However, the sign of the analog offset introduced by the ODAC 160 is opposite from the sign of the effective offset in the analog signal path. In this way, the DC-restore-loop cancels the effective offset in the analog signal path.

The continuous time filter 128 also receives a read/write clock signal 206 and a servo clock signal 202, as illustrated in FIG. 2. A read/write clock generator 204 generates the read/write clock signal 206 and a servo clock generator 200 generates the servo clock signal 202, as illustrated in FIG. 2. In addition to being sent to the continuous time filter 128, the read/write clock signal 206 and the servo clock signal 202 are also sent to a clock multiplexer 208. The clock multiplexer 208 then allows either the read/write clock signal 206 or the servo clock signal 202, depending on whether the read write channel 108 is in read mode or in servo mode, to pass through the clock multiplexer 208 and pass to both the ADC 132 and a view DAC 212, as illustrated in FIG. 2. The view DAC 212 also receives a 7 bit view DAC data from another portion of the read/write channel 108 and generates a view DAC output signal 214.

Referring now to FIG. 3, there is shown an exemplary diagram of the continuous time filter 128 supporting a separate read filter circuit 254 and a separate servo filter circuit 256 for use with the hard disk drive 100 of FIG. 1A. For clarity, some components have been omitted. The read filter circuit 254 includes a divider 228, a resistor capacitor (RC) filter 230, a limiter 232, a level shifter 234, an inverter 236, an NMOS device 237, a phase detector 238, a charge pump 244, a loop filter 246, and a read filter (RCTF) 224.

The divider 228, the RC filter 230, the limiter 232, the level shifter 234, the inverter 236, and the NMOS device 237 form a calibration signal generator circuit designed to generate a calibration signal 241 used to calibrate the read filter 224. The divider 228 receives the read/write clock signal 206, having a set frequency, from the read/write clock generator 204. While in this embodiment, the divider 228 receives the read/write clock signal 206, the divider 228 may receive a clock signal generated by an alternate clock generator. The divider 228 divides the frequency of the read/write clock signal 206 by a fixed multiple to generate a divided signal 229. So, for example, the divider 228 may receive a read/write clock signal 206 having a frequency of 800 MHz and divide that signal by 4 to produce a divided signal 229 having a frequency of 200 MHz. The divider 228 sends the divided signal 229 to the RC filter 230 which slows the rise and fall time of the divided signal 229 so that the divided signal 229 has a "softer" appearance. The RC filter 230 then sends the resultant signal to the limiter 232 which then reduces the strength of the signal by essentially reducing the voltage of the signal to produce a voltage limited signal 233. The voltage limited signal 233 then is sent to the level shifter 234 which offsets the value of the voltage limited signal 233 by adding or subtracting a fixed amount of voltage to the voltage limited signal 233, thus creating a calibration signal 241. The calibration signal 241 is sent to the NMOS device 237. Additionally, the inverter 236 receives the read gate signal 216. The inverter 236 inverts the read gate signal 216 and creates an inverted signal 239. The inverted signal 239 is then sent to the NMOS device 237 and the charge pump 244.

The NMOS device 237 has a gate that is controlled by the inverted signal 239. For example, in one preferred embodiment, if the value of the read gate signal 216 is high, the value of the inverted signal 239 is low, and therefore the gate within the NMOS device 237 is turned off and the NMOS device 237 does not allow the calibration signal 241 to pass through to the phase detector 238 and the read filter 224. Additionally, if the value of the read gate signal 216 is high, the value of the inverted signal 239 is low, and therefore the charge pump 244 is disabled, so that regardless of the outputs of the phase detector 238, the charge pump 244 does not generate any current output. However, if the value of the read gate signal 216 is low, the value of the inverted signal 239 is high, and therefore the gate within the NMOS device 237 is turned on and the NMOS device 237 allows the calibration signal 241 to pass to the phase detector 238 and the read filter 224. Additionally, if the value of the read gate signal 216 is low, the value of the inverted signal 239 is high, and the charge pump 244 is enabled and therefore can generate positive and negative output currents depending on output values of phase detector 238. While in the above described embodiment, the NMOS device 237 is used to control whether or not the calibration signal 241 is allowed to pass to the phase detector 238 and the read filter 224, other devices known to those skilled in the art may be used.

The calibration signal 241 has been generated in order to calibrate the read filter 224. If the read gate signal 216 is low, the gate within the NMOS device 237 turns on and allows the calibration signal 241 to pass through to the phase detector 238 and the read filter 224. Additionally, if the read gate signal 216 is low, that is, if the read gate signal 216 is not received, the gate 217 of the input multiplexer 220 is turned off and does not allow the analog signal 215 to pass through to the read filter 224. However, if the read gate signal 216 is high, the gate within the NMOS device 237 turns off and does not allow the calibration signal 241 to pass through to the phase detector 238 and the read filter 224. Additionally, if the read gate signal 216 is high, the gate 217 of the input multiplexer 220 is turned on and allows the analog signal 215 to pass through to the read filter 224. In this way, when the read gate signal 216 is low, the read filter 224 is calibrated, and when the read gate signal 216 is high, the read filter 224 immediately receives and filters the analog signal 215 without having to wait. Moreover, by allowing the read filter 224 to immediately receive and filter the analog signal 215, without having to wait, the switching time for the continuous time filter 128 is reduced.

The phase detector 238, the charge pump 244, and the loop filter 246 form a read filter calibration circuit. The goal of the read filter calibration circuit is to calibrate and tune the cut off frequency of read filter 224 to a value, which is related to the value of the read/write clock signal 206. This is done in such a way that the calibration signal 241 input into the read filter 224 and the signal output from the read filter 224, a read filter output signal 225, have the same phase. If the read gate signal 216 is low signal, the calibration signal 241 passes through the NMOS device 237 and enters the phase detector 238 and the read filter 224, as illustrated in FIG. 3. The phase detector 238 receives the calibration signal 241 and compares the phase of the calibration signal 241 with the phase of the read filter output signal 225. The read filter output signal 225 is the signal that is generated by and output from the read filter 224. In one preferred embodiment, the read filter calibration circuit also includes a phase shifter 250. In this embodiment, the read filter output signal 225 enters the phase shifter 250, which shifts the phase of the read filter output signal 225 by a nominal amount and then send the phase shifted read filter output signal 225 to the phase detector 238.

Upon comparing the phase of the calibration signal 241 with the phase of the read filter output signal 225, the phase detector 238 generates either an up signal 240 or a down signal 242, if the phases of the calibration signal 241 and the read filter output signal 225 are not the same. The signal that is output from the phase detector 238 then enters the charge pump 244. The charge pump 244 generates positive or negative output current depending on the value of the up signal 240 and the down signal 242 output from the phase detector 238. The charge pump 244 in combination with the loop filter 246 generates a read tuning voltage 248 which is then used to increase or decrease the cut off frequency of the read filter 224 until the phase of the analog signal 215 entering the read filter 224 and the phase of the read filter output signal 225 are the same.

Once the read filter 224 is calibrated, the read filter 224 is ready to filter the analog signal 215 entering the read filter 224. Read filter 224 includes a frequency dependent transfer function which then filters and modifies the analog signal 215 by either amplifying or attenuating portions of the analog signal 215 depending on the frequency of the analog signal 215. As a result, read filter 224 generates the read filter output signal 225, as illustrated in FIG. 3. The read filter output signal 225 is then sent to the output multiplexer 222, which, depending on the value of the read gate signal 216, either lets the read filter output signal 225 pass through the output multiplexer 222 and go to the buffer 130, or prevents the read filter output signal 225 from passing through the output multiplexer 222.

The servo filter circuit 256 includes a divider 328, a resistor capacitor (RC) filter 330, a limiter 332, a level shifter 334, an inverter 336, an NMOS device 337, a phase detector 338, a charge pump 344, a loop filter 346, and a servo filter (SCTF) 226. The divider 328, the RC filter 330, the limiter 332, the level shifter 334, the inverter 336, and the NMOS device 337 form a calibration signal generator circuit designed to generate a calibration signal 341 used to calibrate the servo filter 226. The divider 328 receives the servo clock signal 202, having a set frequency, from the servo clock generator 200. While in this embodiment, the divider 328 receives the servo clock signal 202, the divider 328 may receive a clock signal generated by an alternate clock generator. The divider 328 divides the frequency of the servo clock signal 202 by a fixed multiple to generate a divided signal 329. The divider 328 sends the divided signal 329 to the RC filter 330 which slows the rise and fall time of the divided signal 329 so that the divided signal 329 has a "softer" appearance. The RC filter 330 then sends the resultant signal to the limiter 332 which then reduces the strength of the signal by essentially reducing the voltage of the signal to produce a voltage limited signal 333. The voltage limited signal 333 then is sent to the level shifter 334 which offsets the value of the voltage limited signal 333 by adding or subtracting a fixed amount of voltage to the voltage limited signal 333, thus creating a calibration signal 341. The calibration signal 341 is sent to the NMOS device 337. Additionally, the inverter 336 receives the servo gate signal 218. The inverter 336 inverts the servo gate signal 218 and creates an inverted signal 339. The inverted signal 339 is then sent to the NMOS device 337 and the charge pump 344.

The NMOS device 337 has a gate that is controlled by the inverted signal 339. For example, in one preferred embodiment, if the value of the servo gate signal 218 is high, the value of the inverted signal 339 is low, and therefore the gate within the NMOS device 337 is turned off and the NMOS device 337 does not allow the calibration signal 341 to pass through to the phase detector 338 and the servo filter 226. Additionally, if the value of the servo gate signal 218 is high, the value of the inverted signal 339 is low, and therefore the charge pump 344 is disabled, so that regardless of the outputs of the phase detector 338, the charge pump 344 does not generate any current output. However, if the value of the servo gate signal 218 is low, the value of the inverted signal 339 is high, and therefore the gate within the NMOS device 337 is turned on and the NMOS device 337 allows the calibration signal 341 to pass to the phase detector 338 and the servo filter 226. Additionally, if the value of the servo gate signal 218 is low, the value of the inverted signal 339 is high, and the charge pump 344 is enabled and therefore can generate positive and negative output currents depending on output values of phase detector 338. While in the above described embodiment, the NMOS device 337 is used to control whether or not the calibration signal 341 is allowed to pass to the phase detector 338 and the servo filter 226, other devices known to those skilled in the art may be used.

The calibration signal 341 has been generated in order to calibrate the servo filter 226. If the servo gate signal 218 is low, the gate within the NMOS device 337 turns on and allows the calibration signal 341 to pass through to the phase detector 338 and the servo filter 226. Additionally, if the servo gate signal 218 is low, that is, the servo gate signal 218 is not received, the gate 219 within the input multiplexer 220 is turned off and does not allow the analog signal 215 to pass through to the servo filter 226. However, if the servo gate signal 218 is high, the gate within the NMOS device 337 turns off and does not allow the calibration signal 341 to pass through to the phase detector 338 and the servo filter 226. Additionally, if the servo gate signal 218 is high, the gate 219 within the input multiplexer 220 is turned on and allows the analog signal 215 to pass through to the servo filter 226. In this way, when the servo gate signal 218 is low, the servo filter 226 is calibrated, and when the servo gate signal 218 is high, the servo filter 226 immediately receives and filters the analog signal 215 without having to wait. Moreover, by allowing the servo filter 226 to immediately receive and filter the analog signal 215, without having to wait, the switching time for the continuous time filter 128 is reduced.

The phase detector 338, the charge pump 344, and the loop filter 346 form a servo filter calibration circuit. The goal of the servo filter calibration circuit is to calibrate and tune the cut off frequency of the servo filter 226 to a value, which is related to the value of the read/write clock signal 206. This is done in such a way that the calibration signal 341 input into the servo filter 226, and the signal output from the servo filter 226, a servo filter output signal 227, have the same phase. If the servo gate signal 218 is low signal, the calibration signal 341 passes through the NMOS device 337 and enters the phase detector 338 and the servo filter 226, as illustrated in FIG. 3. The phase detector 338 receives the calibration signal 341 and compares the phase of the calibration signal 341 with the phase of the servo filter output signal 227. The servo filter output signal 227 is the signal that is generated by and output from the servo filter 226. In one preferred embodiment, the servo filter calibration circuit also includes a phase shifter 350. In this embodiment, the servo filter output signal 227 enters the phase shifter 350, which shifts the phase of the servo filter output signal 227 by a nominal amount and then send the phase shifted servo filter output signal 227 to the phase detector 338.

Upon comparing the phase of the calibration signal 341 with the phase of the servo filter output signal 227, the phase detector 338 generates either an up signal 340 or a down signal 342, if the phases of the calibration signal 341 and the servo filter output signal 227 are not the same. The signal that is output from the phase detector 338 then enters the charge pump 344. The charge pump 344 generates positive or negative output current depending on the value of the up signal 340 and the down signal 342 output from the phase detector 338. The charge pump 344 in combination with the loop filter 346 generate a servo tuning voltage 252 which is then used to increase or decrease the cut off frequency of the servo filter 226 until the phase of the analog signal 215 entering the servo filter 226 and the phase of the servo filter output signal 227 are the same.

Once the servo filter 226 is calibrated, the servo filter 226 is ready to filter the analog signal 215 entering the servo filter 226. Servo filter 226 includes a frequency dependent transfer function which then filters and modifies the analog signal 215 by either amplifying or attenuating portions of the analog signal 215 depending on the frequency of the analog signal 215. As a result, servo filter 226 generates the servo filter output signal 227, as illustrated in FIG. 3. The servo filter output signal 227 is then sent to the output multiplexer 222, which, depending on the value of the servo gate signal 218, either lets the servo filter output signal 227 pass through the output multiplexer 222 and go to the buffer 130, or prevents the servo filter output signal 227 from passing through the output multiplexer 222.

It is to be noted that suitable transistor sizes specifying channel width-to-length ratios (measured in micrometers or microns) for the transistors which make up the depicted circuits have been omitted from the figures. It will be appreciated that suitable ratios may be chosen depending on the design requirements and the capabilities and limitations of the particular integrated circuit fabrication process used for implementation of the circuit as well as the performance requirements of the specific embodiment.

Thus, there has been disclosed in accordance with the invention, a method and apparatus for operating a continuous time filter of a read/write channel for a hard disk drive that fully provides the advantages set forth above. Although the invention has been described and illustrated with reference to specific illustrative embodiments thereof, it is not intended that the invention be limited to those illustrative embodiments. Those skilled in the art will recognize that variations and modifications can be made without departing from the spirit of the invention. It is therefore intended to include within the invention all such variations and modifications that fall within the scope of the appended claims and equivalents thereof.

I claim:

1. A continuous time filter of a read/write channel for a hard disk drive, wherein the continuous time filter is adapted to receive an analog signal, the continuous time filter comprising:
    a read filter circuit which filters the analog signal when the continuous time filter is in read mode and generates a read filter output signal;
    a servo filter circuit which filters the analog signal when the continuous time filter is in servo mode and generates a servo filter output signal;
    an input multiplexer, wherein the input multiplexer receives the analog signal and transmits the analog signal to the read filter circuit when the continuous time filter is in read mode and to the servo filter circuit when the continuous time filter is in servo mode; and
    an output multiplexer, wherein the output multiplexer receives and transmits the read filter output signal when the continuous time filter is in read mode and receives and transmits the servo filter output signal when the continuous time filter is in servo mode.

2. The continuous time filter of claim 1, wherein the read filter circuit comprises a calibration signal generator circuit, a read filter calibration circuit, and a read filter.

3. The continuous time filter of claim 2, wherein the calibration signal generator circuit comprises a divider, an RC filter, a limiter, a level shifter, an inverter, and an NMOS device.

4. The continuous time filter of claim 2, wherein the read filter calibration circuit comprises a phase detector, a charge pump, and a loop filter.

5. The continuous time filter of claim 4, wherein the read filter calibration circuit further comprises a phase shifter.

6. The continuous time filter of claim 1, wherein the servo filter circuit further comprises a calibration signal generator circuit, a servo filter calibration circuit, and a servo filter.

7. The continuous time filter of claim 6, wherein the calibration signal generator circuit comprises a divider, an RC filter, a limiter, a level shifter, an inverter, and an NMOS device.

8. The continuous time filter of claim 6, wherein the servo filter calibration circuit comprises a phase detector, a charge pump, and a loop filter.

9. The continuous time filter of claim 6, wherein the servo filter calibration circuit further comprises a phase shifter.

10. The continuous time filter of claim 1, wherein the read filter circuit is being calibrated while the servo filter circuit is filtering the analog signal, and wherein the servo filter circuit is being calibrated while the read filter circuit is filtering the analog signal.

11. A method for operating a continuous time filter of a read/write channel for a hard disk drive, the method comprising:
    receiving an analog signal by an input multiplexer;
    routing the analog signal to a read filter circuit when the continuous time filter is in read mode and routing the analog signal to a servo filter circuit when the continuous time filter is in servo mode;
    filtering the analog signal using a read filter circuit when the continuous time filter is in read mode and filtering the analog signal using a servo filter circuit when the continuous time filter is in servo mode; and
    generating a read filter output signal when the continuous time filter is in read mode and generating a servo filter output signal when the continuous time filter is in servo mode.

12. The method of claim 11 further comprising calibrating the read filter circuit while the servo filter circuit is filtering the analog signal, and calibrating the servo filter circuit while the read filter circuit is filtering the analog signal.

13. The method of claim 11, further comprising receiving the read filter output signal by an output multiplexer when the continuous time filter is in read mode and receiving the servo filter output signal by an output multiplexer when the continuous time filter is in servo mode.

14. The method of claim 11, wherein the read filter circuit comprises a calibration signal generator circuit, a read filter calibration circuit, and a read filter.

15. The method of claim 14, further comprising filtering the analog signal with the read filter, wherein the read filter includes a frequency dependent transfer function.

16. The method of claim 11, wherein the servo filter circuit comprises a calibration signal generator circuit, a servo filter calibration circuit, and a servo filter.

17. The method of claim 16, further comprising filtering the analog signal with the servo filter, wherein the servo filter includes a frequency dependent transfer function.

18. The method of claim 16, wherein the calibration signal generator circuit comprises a divider, an RC filter, a limiter, a level shifter, an inverter, and an NMOS device.

19. The method of claim 16, wherein the servo filter calibration circuit comprises a phase detector, a charge pump, and a loop filter.

20. A continuous time filter of a read/write channel for a hard disk drive, wherein the continuous time filter is adapted to receive an analog signal, the continuous time filter comprising:

an input multiplexer, wherein the input multiplexer receives the analog signal and transmits the analog signal to a read filter circuit when the continuous time filter is in read mode and to a servo filter circuit when the continuous time filter is in servo mode; and an output multiplexer, wherein the output multiplexer receives a read filter output signal from the read filter circuit when the continuous time filter is in read mode and receives a servo filter output signal from the servo filter circuit when the continuous time filter is in servo mode.

* * * * *